Aug. 24, 1937.   W. W. LASKER   2,091,049
CARD PUNCH
Original Filed July 18, 1933   8 Sheets-Sheet 1
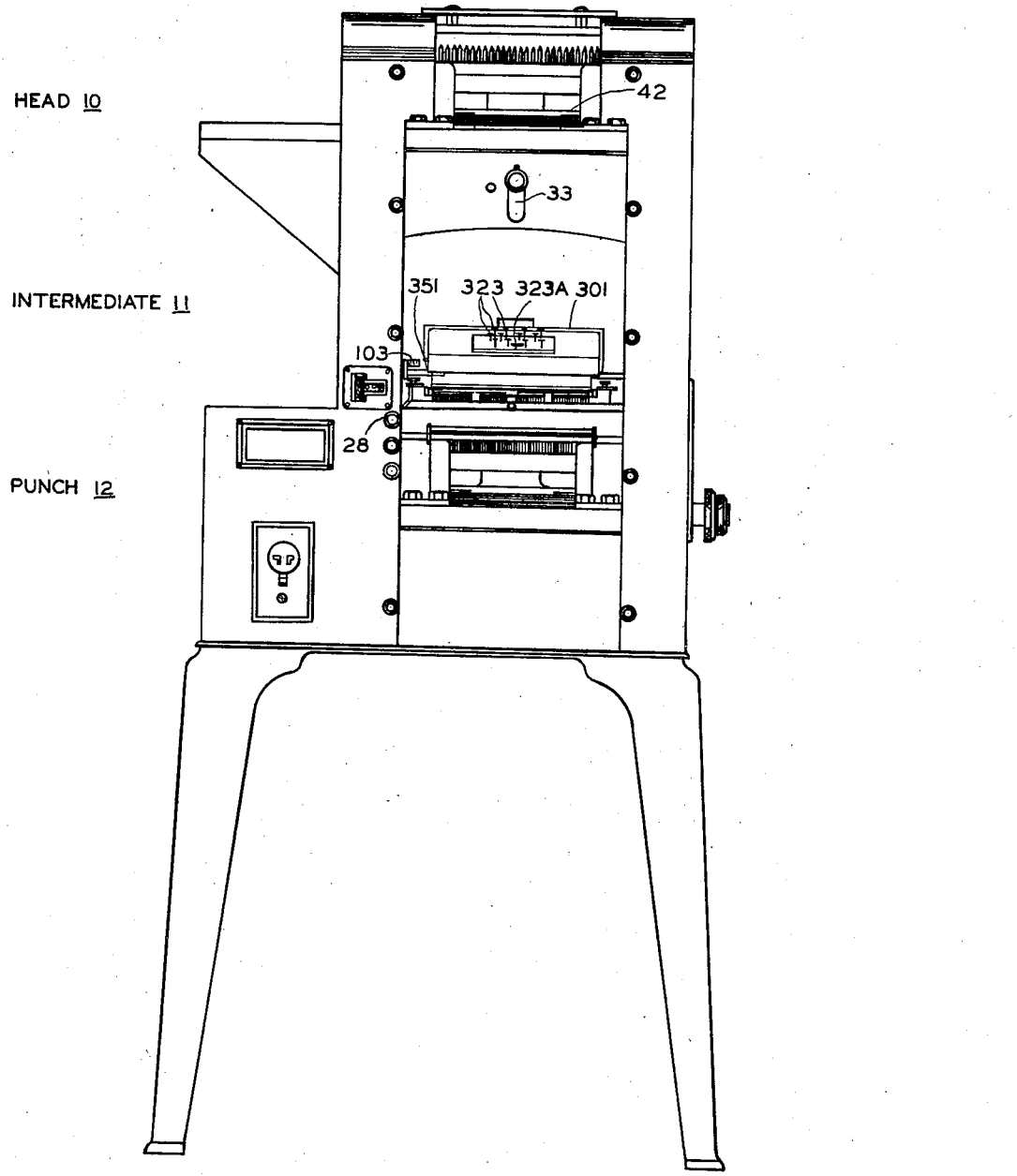
WITNESSES

INVENTOR.
WILLIAM. W. LASKER
BY
ATTORNEY

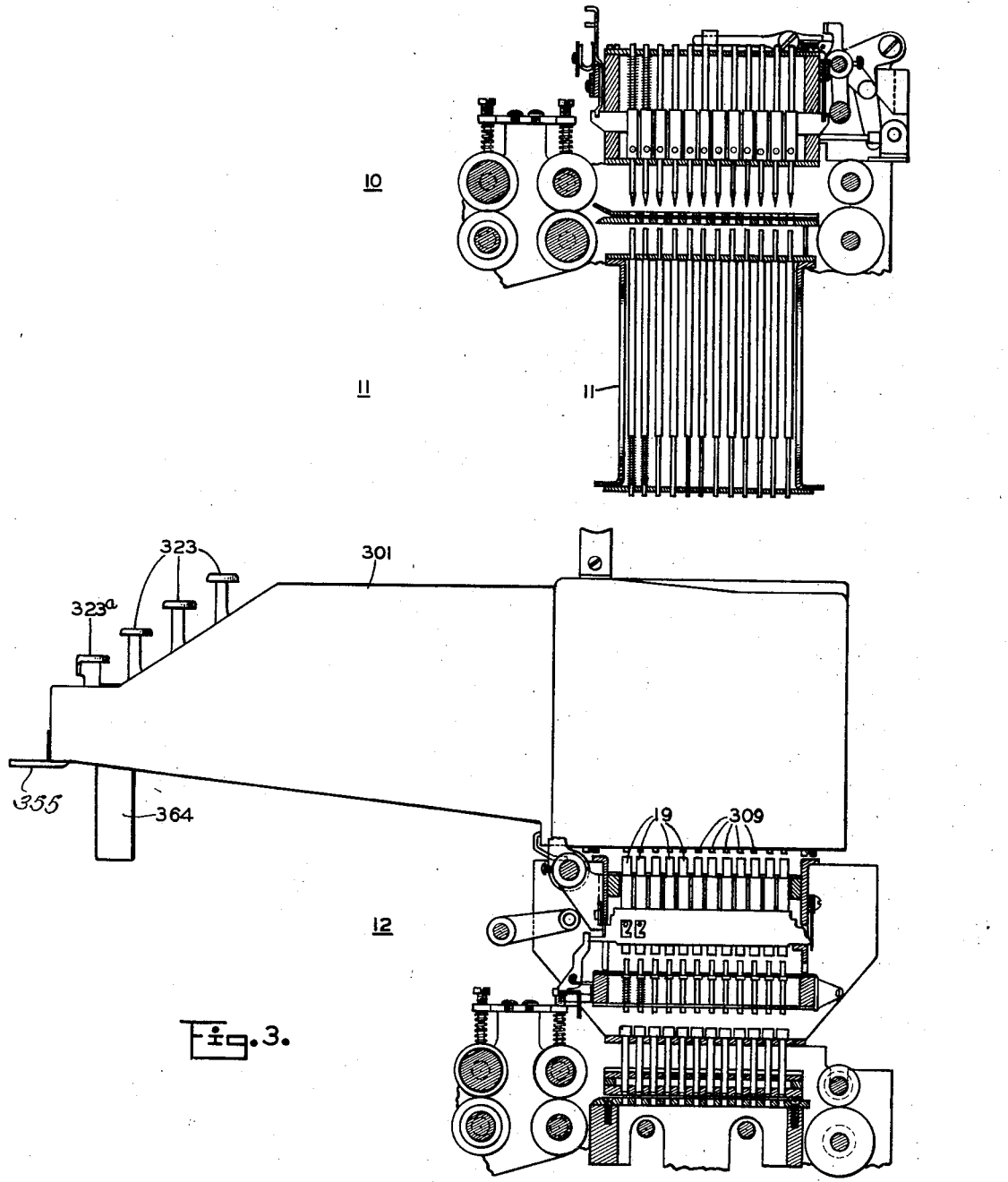

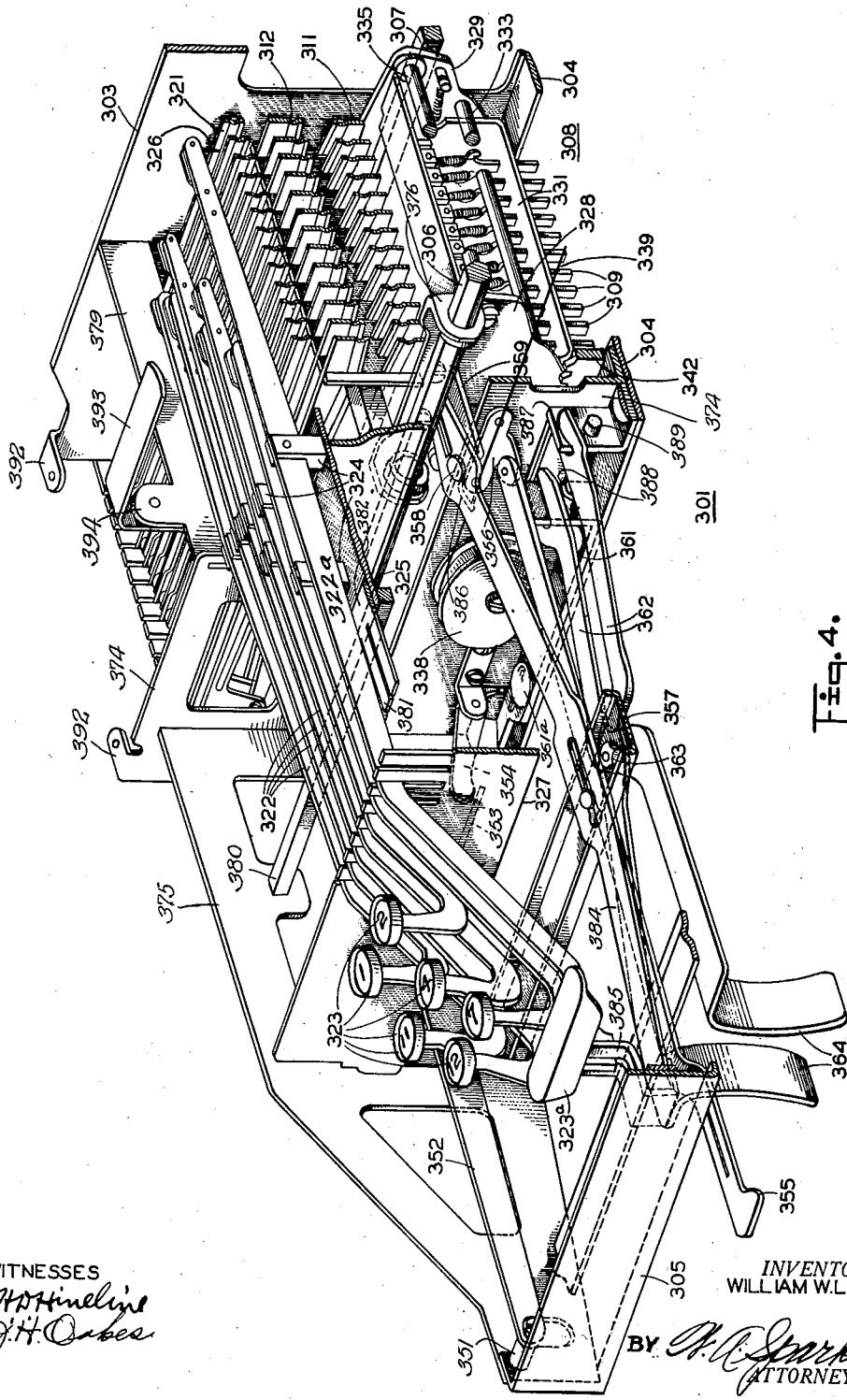

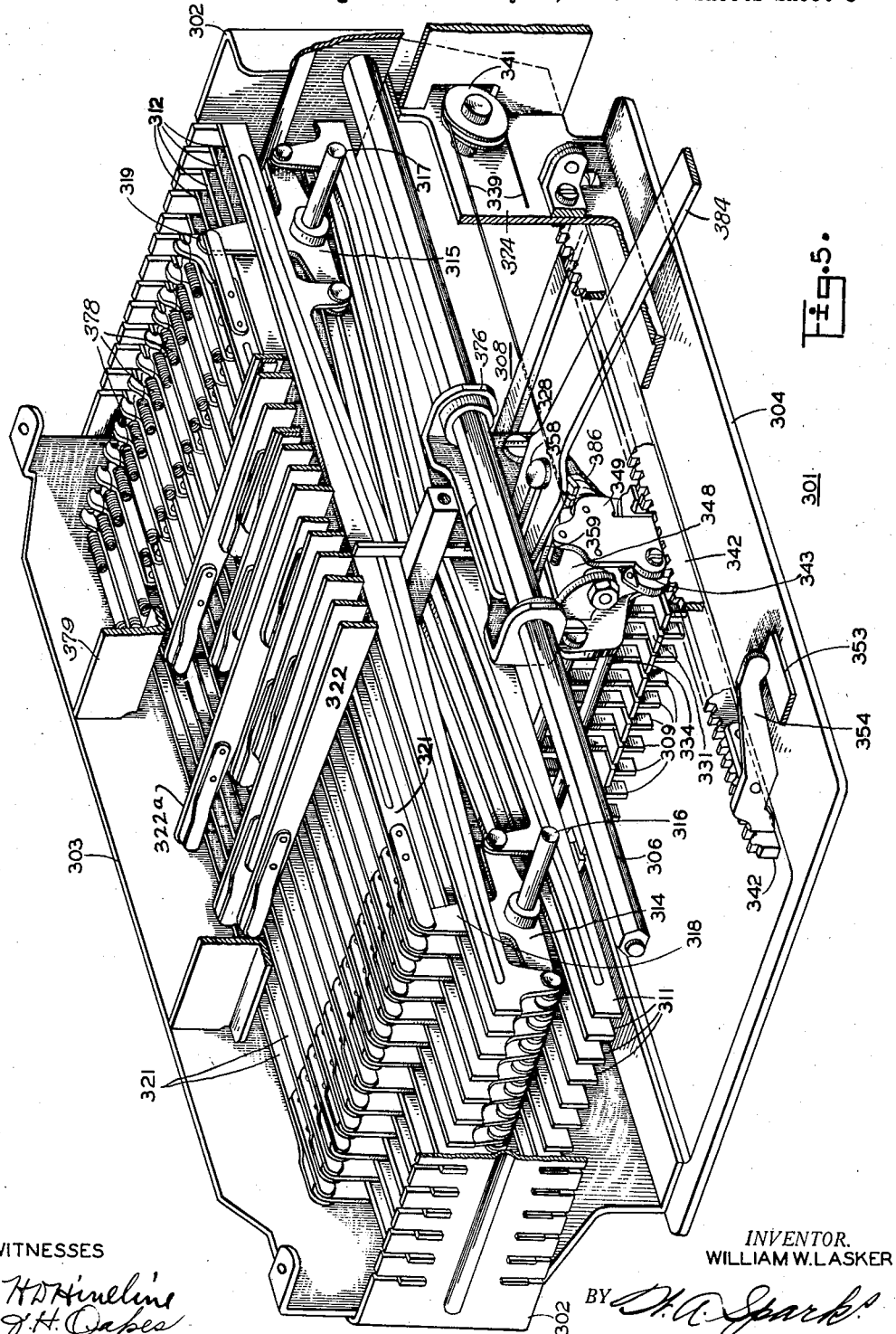

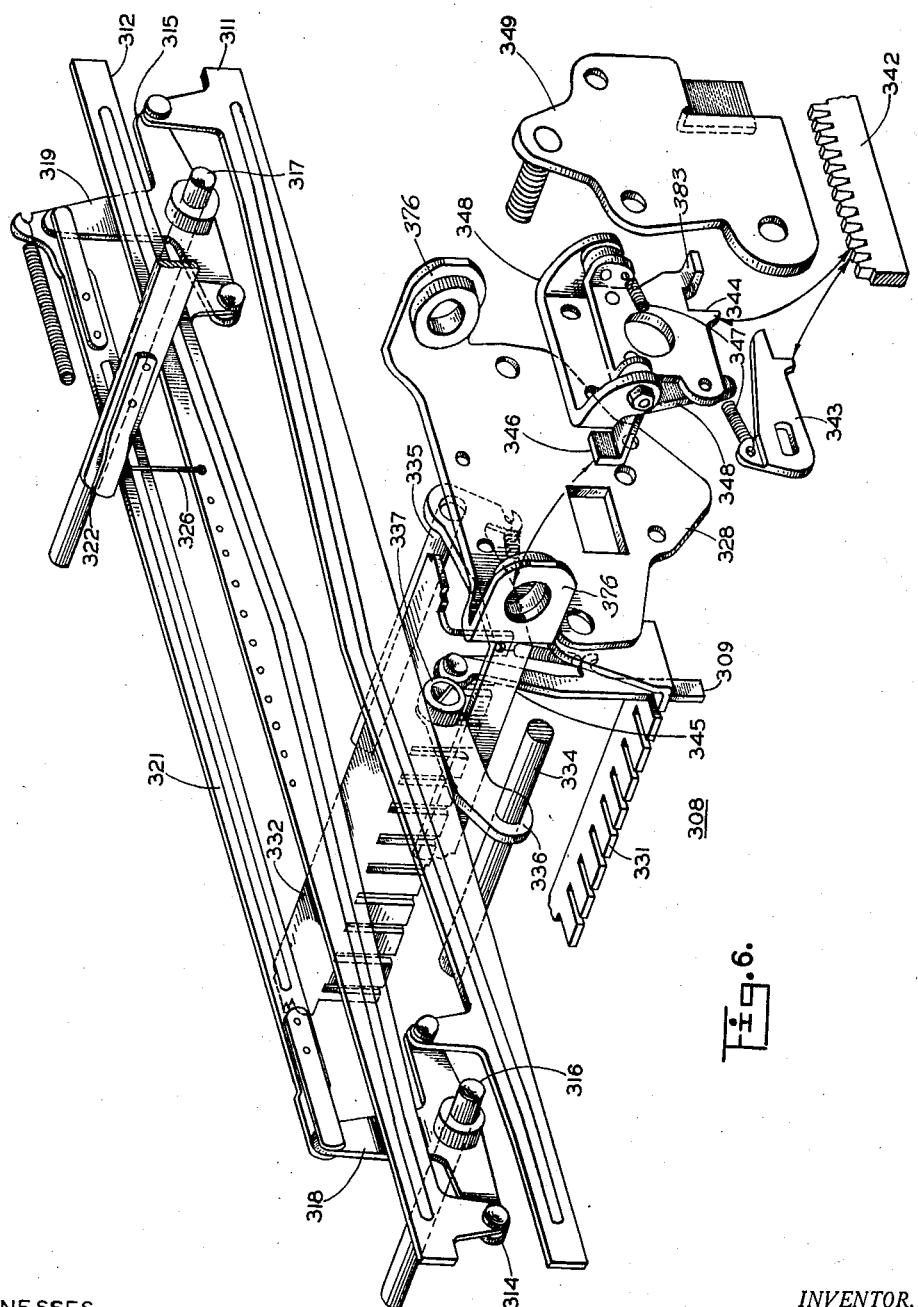

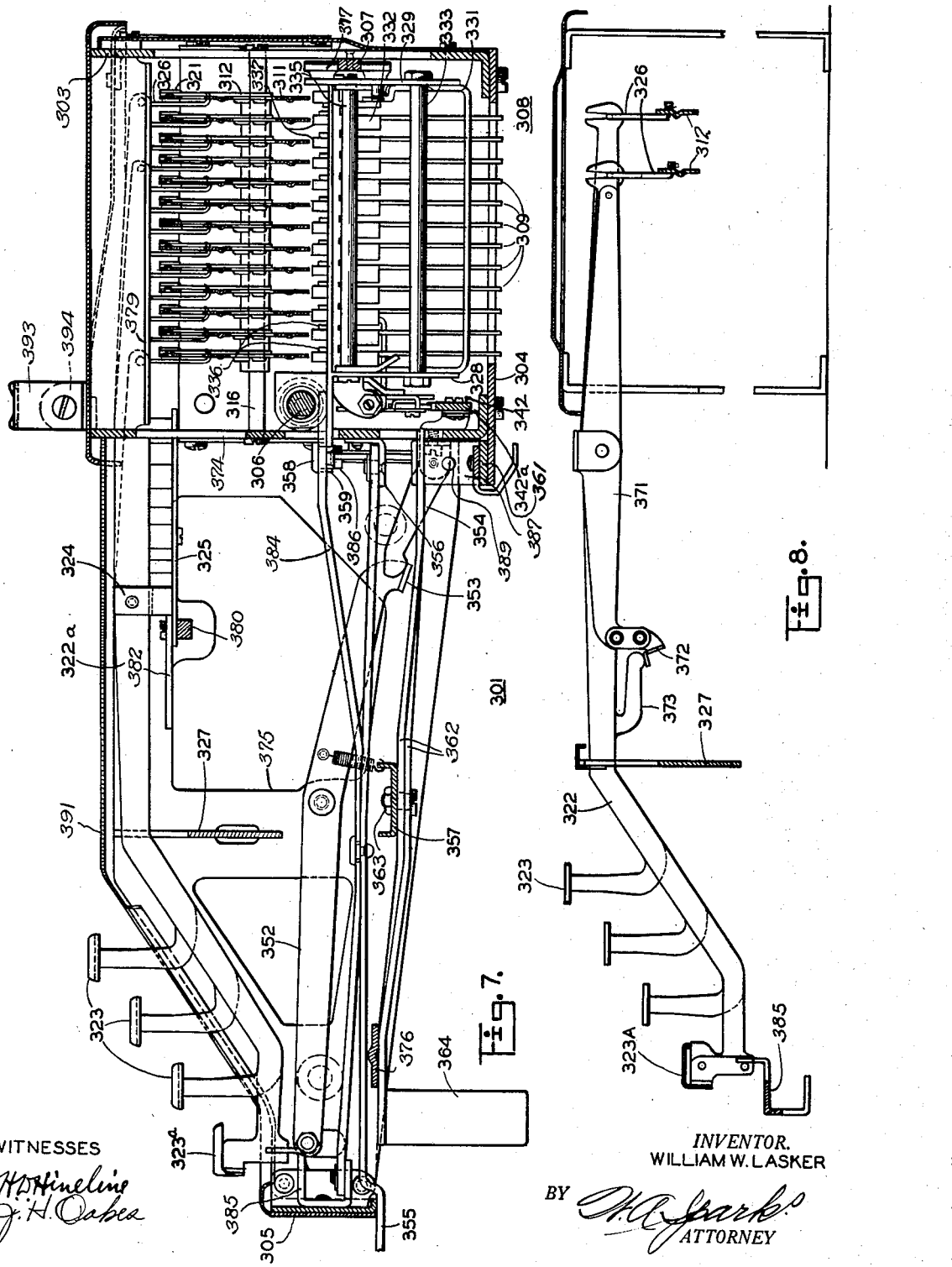

Aug. 24, 1937.   W. W. LASKER   2,091,049
CARD PUNCH
Original Filed July 18, 1933   8 Sheets-Sheet 8

WITNESSES

INVENTOR.
WILLIAM W. LASKER
BY
ATTORNEY

Patented Aug. 24, 1937

2,091,049

UNITED STATES PATENT OFFICE 2,091,049

CARD PUNCH

William W. Lasker, Brooklyn, N. Y., assignor to Remington Rand Inc., Buffalo, N. Y., a corporation of Delaware Original application July 18, 1933, Serial No. 680,922. Divided and this application August 20, 1935, Serial No. 36,958

17 Claims. (Cl. 164—112)

This invention relates to punched card mechanism and particularly to the punch member for the production of punched tabulating cards. Specifically, the invention relates to a keyboard mechanism in combination with punch setting members for the manual operation of an automatic punch.

This application is a division of my application, Ser. No. 680,922, filed July 18, 1933.

In the operation of punched card mechanism, it has been found desirable to construct automatic card reproducing mechanism, for the production of new cards, which may be identical with a single pre-punched card, sequentially the same as a series of pre-punched cards, or may be perforated to represent the same data contained in a pre-punched card or cards but according to a different code. This automatic card reproducing mechanism is fully shown in my Patent No. 2,004,208, granted June 11, 1935, and in my above mentioned copending application, Ser. No. 680,922.

As shown in these disclosures, the mechanism consists of a card-sensing head portion, including card magazines, card conveying rolls and card feeding means, as well as the card-data-code sensing pins. The mechanism further contains a complete card punching mechanism similar to the standard gang punch well known in the art, including card magazines, card feeding means and card conveying rolls, as shown, for instance, in Patents Nos. 1,287,706 and 1,307,682.

The mechanism also contains a connection basket suitable for conveying the readings of the sensing mechanism to the control members of the punch either with or without changes in code or in form. The device also contains driving mechanism, a clutch member, an automatic stop mechanism, operable when the magazines are empty, card counting mechanism, start and stop mechanism and the other elements and devices appropriate for operation as shown in the Patent No. 2,004,208 and application Ser. No. 680,922, mentioned above.

The structure disclosed in this patent and application, however, is adapted only for the automatic reproduction of previously punched cards, and is not adapted to the direct production of cards for the recording of new data.

The invention resides in the provision of a novel manually operable keyboard which enables this keyboard and a translator unit or units to be interchangeably associated with a punch of the translating type whereby the punch may be employed either as a card controlled translating punch or as a manually controlled punch.

The manual keyboard mechanism consists of a frame member to be carried in the connection basket slides in the punch frame, and consists of a group of keys and key levers cooperating with a plurality of parallel motion members, which, in turn, operate push rods in a spacing carriage to set successive punch blocking members in the punch mechanism according to the desired code.

An object of the invention is to operate a punch of the translating type interchangeably from an automatic sensing head or a manual keyboard.

Another object of the invention is to operate a data-recording punch mechanism interchangeably from an automatic sensing mechanism or from a manually operable keyboard according to any one of several different codes.

Still another object of the invention is to operate punched card mechanism through the agency of key levers, a plurality of parallel motion devices controlled by the key levers and depressor bars controlled by said devices and carried in an escapement controlled carriage.

A further object of the invention is to operate recording members from a plurality of parallel motion devices by means of depressor bars in a spaceable carriage.

Still a further object of the invention is to operate recording members according to a multi-unit code from key levers guided in a fixed comb, through the agency of a parallel motion device.

The device of this invention thus consists of a punch mechanism having settable punch control members, a card sensing mechanism, and a plurality of interchangeable members cooperating alternatively with the punch, the interchangeable members including a connection basket having lead wires therein, and a plurality of keyboard members adapted to operate according to various codes each including key levers, a fixed key guiding comb, parallel motion devices and depressor bars supported in a spaceable carriage and adapted to actuate the punch setting mechanism.

Other objects and structural details of the invention will be apparent from the following description when read in connection with the accompanying drawings, wherein:

Fig. 3 is a side view, partly in section, of the manual keyboard member showing its relation to the punch and sensing head mechanism.

Fig. 4 is an orthographic projection view of the keyboard mechanism showing the key levers, carriage return, spaceable carriage, and parallel motion members.

Fig. 5 is an orthographic projection view showing the key lever tails, the parallel motion mechanism, carriage and clutch escapement.

Fig. 6 is an orthographic projection view, showing, in dismantled relationship, the key tails, the parallel motion members, the carriage, and the escapement mechanism.

Fig. 7 is a side view, partly in section, of the keyboard mechanism, the parallel motion members, the carriage, etc.

Fig. 8 is a side view, partly in section, of the keyboard levers for a multi-unit code mechanism.

*Direct keyboard operation*

Figure 1:
Fig. 1 is a front view of the device of this invention showing the manually operable keyboard in place.

Under certain operating conditions, it is desirable to utilize the punch base portion 12 of the translating punch mechanism as a plain punch, without translator duplicating features. For this purpose, the interponent or translator basket 11 of the type shown in Patent No. 2,004,208 and application Ser. No. 680,922, may be removed and replaced by keyboard basket 301, as shown in Fig. 3, which is adapted to cooperate with the punch section 12 of Fig. 1, without change or removal of the head section 10, as is indicated in Fig. 3. The keyboard basket 301 contains keys which may be manipulated manually to set the gags or set-bars 19 in the punch section 12 of the machine. After the punch gags 19 have been thus set, the machine is started manually and cards fed into the punch are automatically perforated in accordance with the gag set up.

The mechanism of the keyboard basket 301 is shown in detail in Figs. 3 to 10, inclusive.

Referring particularly to Figs. 4, 5, and 7, the device consists of a rear and a front frame. The rear frame has a bottom plate 304, a front plate 374, a rear plate 303 supported by the bottom plate, and two side plates 302 attached to the front and rear plates. The front frame has side plates 375 attached to the front plate 374 and a front yoke 305 attached to the side plates 375.

The carriage 308 is adapted to slide on guide rail 306, secured to the side plates 302, and on guide rail 307, attached to the rear plate 303. The front plate 328 of the carriage is provided with two ears 376, extending at right angles to the plate, and the guide rail 306 extends through openings in these ears, as is most clearly shown in Fig. 5. The rear plate 329 of the carriage has two rollers 377 pivoted thereon and these rollers are adapted to slide on the upper and lower edges of the guide rail 307, as is most clearly shown in Fig. 7. The carriage member 308 contains a column of depressor bars 309, which cooperate with the gags or set-bars 19 as shown in Fig. 3. Though only a single column of set-bars 19 is shown in Fig. 3, it is to be understood that 45 columns of these bars are provided, one for each column on a punched card, and that twelve of these bars are provided in each column corresponding to the twelve possible perforations in a column of a punched card. To bring the column of depressor bars 309, supported by the carriage, into register with the set-bars 19 in any column, the carriage member 308 is also provided with an escapement mechanism which will be described later.

Above the carriage 308 there is provided a series of transverse bars 311 and 312 as shown in Figs. 4–7, and as particularly shown in Fig. 6. There are thirteen bars 311 and thirteen bars 312, and they are arranged to cooperate in pairs each of which includes a bar 311 and a corresponding bar 312. The transverse bars 311 and 312 are guided in slots in the side plates 302 as is shown most clearly in Fig. 5, and are supported upon the sets of rocker arms 314 and 315 which, in turn, are carried upon the shafts 316 and 317 as shown in Figs. 5 and 6. The rocker arms 314 and 315, on the shafts 316 and 317, support the weight of the bars 311 and 312, and cause them to move in opposite directions, that is, when 312 is moved up, 311 is moved down. As indicated the several rocker arms have side projections 318 and 319, pairs of which are tied together by cross rods 321, which are individually biased towards the left-hand side of the machine, looking from front to rear, by springs 378 tensioned between a tab on one end of each rod and an L-shaped plate 379 attached to the rear plate 303 and to the front plate 374, as is particularly shown in Fig. 5. This produces a parallel motion system in which the pairs of bars 311 and 312, as shown, move in the same plane but in opposite directions.

Above the tie rods 321 are positioned the key levers 322, 322a, as best shown in Figs. 4 and 5. At their front ends, the key levers 322, 322a carry the key tablets 323 and, at its front end, the key lever 322a carries the key tablet 323a as shown. The keys 323 correspond to the 12 possible perforations in a column of a card and carry the numbers 1–12 representing those positions, while the key 323a is a space key. The key levers 322 and 322a are journaled on pivots 324. The pivot members 324 are mounted upon the plate member 325, as particularly shown in Figs. 4 and 7, which is attached to the front plate 374 and to a bar 380 supported by the side plates 375. The tails of the key levers 322 and 322a are respectively tied to the appropriate bars 312 by the tie wires 326, as best shown in Figs. 4 and 6. The front ends of the key levers 322 and 322a are guided in a comb plate 327, extending between the side plates 375. The upward movement of the keys is limited by the depth of the slots in the side plates 302, while their downward movement is limited by stop 381 on comb plate 382 secured to the plate 325.

The carriage member 308 consists of a front plate 328 and a back plate 329 as shown. The front and rear plate members are connected by a bottom comb plate 331 and a top comb plate 332. Tie rod members 333, 334 and 335 provide further strength and stiffness to the carriage structure.

As shown in Fig. 3, the depressor members 309, cooperate with the gags or set-bars 19. Referring to Fig. 6, the depressor members 309 are attached to auxiliary swinging lever members 336 journaled on the tie bar 334. There are thirteen of these levers 336, as shown in Fig. 7, and they are individually operable by cross rods 311. The members 336 respectively carry at the free ends anti-friction rollers 337, which are respectively adapted to cooperate with the cross rods 311 in any position of the carriage member 308. Thus, any one of the twelve depressor members 309 can be depressed to set a gag or set-bar 19 by movement of the corresponding transverse bar 311 under the operation of the appropriate key, without regard to the position of the carriage.

The carriage is propelled by a spring and pulley member 338, particularly shown in Fig. 4 which is attached to the front plate 374. From the member 338 the cord member 339 is led over a pulley 341 (Fig. 5), which is secured to the front plate 374, and is attached to the carriage.

The escapement mechanism consists of a rack member 342 cooperating with a pawl 343 as shown in Figs. 5 and 6, and a swinging member 344 under the control of a bail member 345, which is actuated each time a depressor member 309 and its auxiliary swinging lever 336 is actuated to move the stop pawl thereon into engagement with the rack bar 342 and then to disengage the pawl 343 from the rack bar.

The lever member 346 is attached by the rivets shown to the top of the swinging member 344, and it enters through the square hole in the front plate member 328 to cooperate with the bottom edge of the bail member 345 as indicated.

It is to be observed that the space key 323a is connected through the lever 322a to the rear one of the transverse parallel motion bars 312; as shown in Figs. 4 and 7. The bar 311, cooperating with this bar 312, is not provided with an associated depressor bar 309, but is provided with merely an associated lever member 336, as shown in Fig. 7, to actuate the bail 345 to give a spacing action to the carriage without depressing a gag or set-bar.

The pawl 343 is carried upon a bearing member consisting of a pin passing through the opening shown in the lower left-hand corner of the swinging member 344; the member 343 being adapted to slide lengthwise over the pin by means of the slot shown, under the urge of a spring 347 attached to the ear above the slot in the ratchet member 343. The other end of the spring 347 is attached to the swinging member 344, as shown. The right-hand end of the ratchet member 343 (as shown in Figs. 5 and 6) is carried upon the shelf portion 383 of the swinging member 344 at the lower right-hand corner as indicated. Accordingly when the swinging member 344 disengages the pawl 343 from the rack bar, the spring 347 moves the pawl forward far enough for it to engage the next tooth on the rack bar, this forward movement being limited by the arm on the pawl which engages the shelf portion 383. When the swinging member 344 is returned to its normal position, the pawl 343 is first brought into engagement with the advanced tooth on the rack bar and the stop pawl on the swinging member is then disengaged from the rack bar. The carriage is then advanced the distance of one tooth by the spring and pulley member 338. The shelf portion 383 limits the downward movement of the ratchet member 343 for a purpose to be stated later. The bracket member 348, with the depending tongue, shown, is attached to the front plate member 328 in any convenient manner as by rivets or screws. The escapement mechanism is protected by a guard plate 349 as shown, which also is supported on the front plate 328.

A skip key, consisting of a projecting member 351, as shown in Figs. 4, 7, 9 and 10, is connected to a lever member 352, shown in Figs. 4 and 7 carrying a plate member 353. The lever 352 (as shown in Fig. 7) is normally held in depressed position by a spring connected to the lever and to a plate 357 extending between the side plates 375. The plate member serves to actuate a lever member 354, which is attached to the escapement rack member 342, to depress the said rack member which is normally disposed above the base plate 304, as shown in Figs. 4, 5, and 7. The rack member is normally retained in this position by a spring 342a (see Fig. 7) which is attached to the rack member and has its free ends resting on the horizontal flange of the front plate 374.

The carriage return mechanism consists of a lever 355 having a front end projecting below and forwardly from the keys 323 under the front yoke member 305. The lever 355 is pivoted on a bracket 356 attached to the front plate 374. Disposed above the lever 355 is another lever 384 which returns the carriage 308 to its extreme left-hand position when the lever 355 is moved to its extreme left-hand position. The lever 384 is slidably connected to the lever 355 by a pin and slot connection, and the slot, which is in the lever 384, is of sufficient length to permit one end of the lever to follow the movements of the carriage 308. The outer end of the lever 384 is pivoted to a bracket 385, attached to the front yoke 305, and its inner end is bifurcated and encloses a stud 358 positioned in a bracket 359 attached to the front plate 328 of the carriage. To the under side of this bracket there is attached a slotted plate 386. The cord 339 is knotted at one end and is extended through the slot in the plate where it is held by its knotted end, as may be seen from Fig. 4.

The bottom plate member 304 is of approximately the same size and contour as the bottom plate of the translator basket 11, shown in Fig. 3, and is equipped with similar latch members as shown in Figs. 4 and 7. These consist of sliding members 361 as indicated in Figs. 4 and 7, each of which is slidably mounted on the bottom plate 304 by a bolt 361a fixed to the bottom plate and extending through a slot in the slide 361, as shown in Fig. 4. The slides terminate at their inner ends in shoulders 387 which are biased away from each other by a spring 388 compressed between the shoulders and supported on a bolt 389 which has its opposite ends extending through openings in the shoulders. The slides 361 are actuated by tong members 362 as shown, the tong members being pivoted on a bolt 363, carried by the frame cross member 357. The tongs are equipped with finger grips 364 at the front end, positioned adjacent the front yoke member 305.

Figure 2:
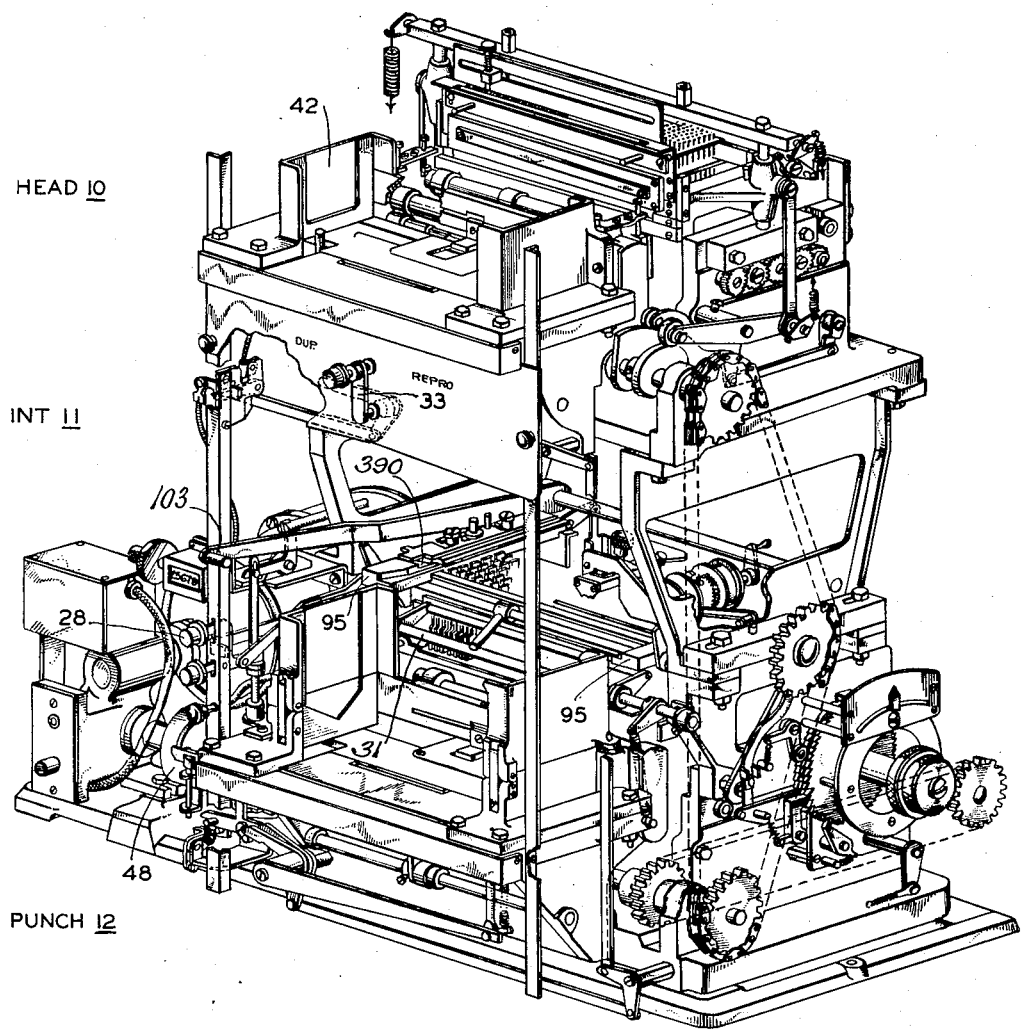
Fig. 2 is an orthographic projection view of the punch mechanism and sensing head member of the invention.

In the operation of this form of the invention, the translator basket 11 may be removed from the punch mechanism in the manner described in the above mentioned Patent No. 2,004,208 and application, Serial No. 680,922. The keyboard basket as above described may then be inserted by closing the finger grips 364 of the tongs, sliding the bottom plate member into the grooves in the members 95, as shown in Fig. 2 until the latching members 361 enter the notches 390 on the members 95 under the influence of spring 388. When the keyboard basket is thus latched to the members 95, the position lever 103 is depressed manually to position the keyboard basket in operative relation to the punch 12 (Fig. 1), as will be understood by reference to page 5, lines 27–39, inclusive, in my Patent No. 2,004,208, and to the first paragraph on page 28 of my co-pending application Serial No. 680,922, both above referred to. The carriage may then be brought to the left-hand position by swinging the front end of the lever 355 to the left. Any one of the keys 323 may then be depressed according to the digit to be recorded. Depressing of a key pivots the corresponding lever 322 on the pivot 324 to lift the tail of the key lever, thereby pulling upwards on the connecting wire 326 to raise the cross bar member 312, swing the lever members 314 and 315 and depress the bar member 311, the tie rods 321 being swung sidewise to insure parallel motion of the bars 311 and 312. The downward movement of the bar 311 depresses the corresponding lever member 336 in the carriage 308, whatever may be its position along the rails 306 and 307, and thereby depresses the corresponding member 309 to depress a set-bar 19 to indicate the desired digit in the first column. Simultaneously, the bail member 345 is depressed and the plate member 344 in the escapement mechanism swung sidewise. This carries the ratchet 343 sidewise off of the rack bar 342 and it is moved forward one tooth by the spring member 347, ready to engage with the next ratchet tooth. Upon release of the key 323, the key lever returns to its original position, as do the cross bars 311 and 312, and their associated mechanism, raising the members 336 and 309 and the bail 345. This allows the plate member 344 also to return to its original position free of the rack bar 342 and the ratchet member 343 likewise is returned to its position engaged with the rack bar and the carriage moved one step along the rack bar.

This procedure may be continued to set the desired sequence of set-bars in the successive card field columns. If it is desired to skip a column, the space key 323a may be operated, which produces a similar sequence of movements up to the point of the movement of a depressor member 309, but causes a movement only of the bail member 345 and the operation of the escapement mechanism to move the carriage one step without depressing a set-bar.

Depression of the carriage release (or skip) key 351 depresses the escapement rack bar 342 and allows the carriage to travel freely toward its extreme right-hand position. When the rack bar 342 is depressed, the pawl 343 is prevented from following the bar in its downward movement thereby preventing the release of the carriage, by the shelf-portion 383 of the member 344 (see Fig. 6) which limits the downward movement of the pawl.

When the desired gags have been set by the keyboard, movement of the trip key 28 (Figs. 1 and 2) will engage the clutch member 48, in the manner described on page 30 and the first paragraph on page 31 of my co-pending application, Serial No. 680,922, and cause the usual operation of the die member to punch the desired card. If the lever member 33 (Figs. 1 and 2) is set in the duplicating position, the punch will continue to operate for the punching of a number of similar cards until the trip key 28 is depressed a second time. If, however, the lever 33 is left in the reproducing position, and the card magazine 42 is empty, only one operation of the punch will be secured since the automatic stop mechanism associated with the card magazine 42 will throw out the clutch mechanism at the end of the first revolution. In order to obtain a number of similar cards, it is necessary, of course, to disable the clearing bar 31 as described, since otherwise the set-bars are all released after the first operation. For a description of the lever 33 and of its operation, see page 31, lines 21–27, inclusive, of my co-pending application Serial No. 680,922. For a description of the manner of disabling the clearing bar 31, see the co-pending application just mentioned, at page 16, lines 5–19, inclusive. The desired card or cards having been punched, the carriage 308 may be returned to initial position by actuation of the lever 355 whereupon another set-up may be prepared for the punching of additional cards. When the desired cards have been punched, the key basket may be removed by the sequence of operation, including the release of the depressing lever 103 (Figs. 1 and 2), as previously described, compression of the finger grips 364, and the drawing forward of the basket member, whereafter it may be replaced by any other desired translating basket.

By the mechanism as above described, it is thus possible to set up manually the desired digits for the punching of new cards in the duplicating or reproducing punch system without the aid of master cards in the sensing head 10 of the machine.

When, on the other hand, instead of the keyboard, various translators of the type disclosed in my co-pending application, Serial No. 680,922, are positioned in the intermediate section 11 (Fig. 1) of the machine, cards perforated according to one code may be fed through the head 10 of the machine, and by reason of a series of substitutions effected by the translator, other cards fed through the punch 12 will be perforated according to another code.

*90-column direct keyboard operation*

Figure 9:
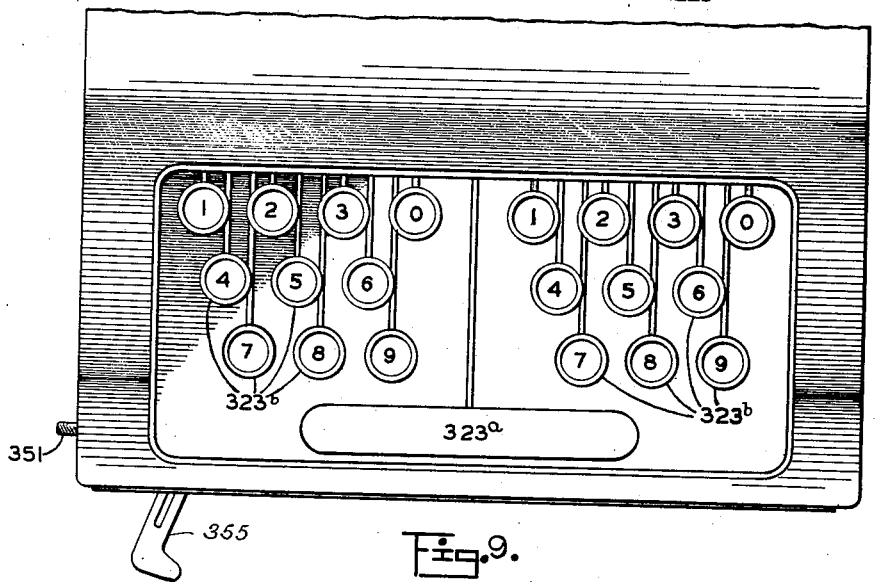
Fig. 9 is a top view of a duplex keyboard for multi-unit code punching.
Figure 10:
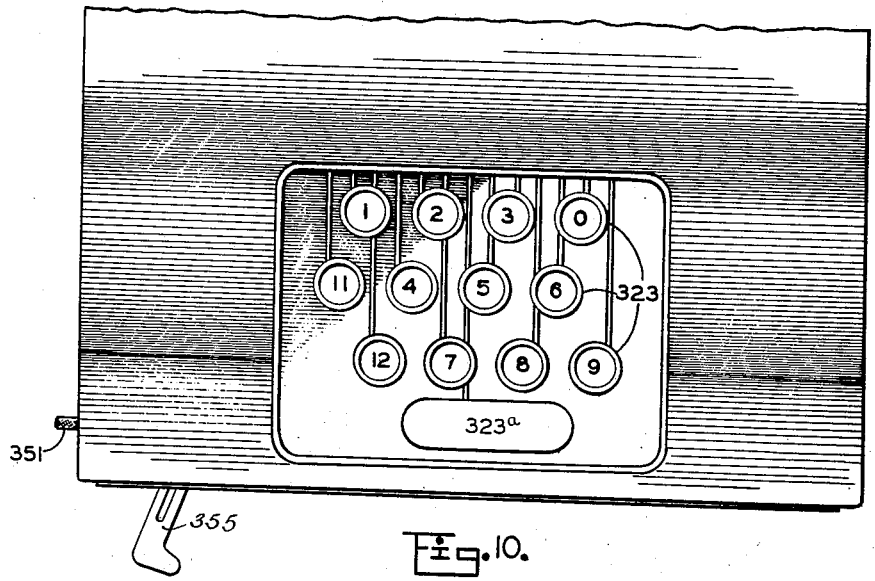
Fig. 10 is a top view of a single unit code keyboard.

In some instances, it may be desirable to provide a keyboard basket which is capable of setting up the punch 12 (see Fig. 1) to perforate cards in accordance with a 90-column code whenever the keyboard basket is substituted for a translator basket in the intermediate section 11 of the machine. For this purpose a keyboard basket, in general similar to that just described but having two keyboards, one for the upper field and one for the lower field, may be utilized as shown in Fig. 9. This requires a double number of digit keys 323b (twenty keys) and a single space key 323a. The key levers are similar to those in the previously described embodiment, as is indicated in Fig. 8, and a similar carriage and escapement mechanism is provided, as well as a similar system of parallel motion bars. An auxiliary lever 371 is provided as shown in Fig. 8, having a cross bracket member 372 cooperating with auxiliary fingers 373 on the key levers of the even numbered keys. Similar tie wires 326 are provided connecting the tails of the key levers 322 to the parallel motion cross bars 312 (Fig. 7). It will be noted, however, that the tie wires 326 shown in Figs. 4 and 6, cooperate with fitted holes in the tails of the levers 322, whereas those shown in Fig. 8 cooperate with slots in the tails of the levers 322. This slot is not provided, however, in the levers 322 connected to the zero, nine and space keys. The purpose of this construction will be pointed out later. As shown, the lever 371 for the upper field keys cooperates with the seventh from the front of the transverse bars 312 (and similarly another lever 371 cooperating with the lower field keys is connected to the first from the front of the bars 312). The zero key, and the odd keys 323 are each connected by a wire 326 to an individual transverse bar 312. Each even key is connected by a wire 326 to the same transverse bar 312 to which the next lower odd digit key is connected and, as previously stated, is also connected to the nine key through suitable linkage. The previously mentioned slots in the levers 322 permit the wires 326, connected to the even key levers 322, to rise whenever an odd key is depressed, and vice versa, thus preventing the depression of the next higher even digit key 323 when an odd digit key is depressed, and the depression of the next lower odd digit key 323 whenever an even key is depressed.

In the operation of this embodiment, steps similar to those described for the operation of the previous embodiment are utilized, except that the even numbered digit keys, when depressed, are caused, through the agency of the fingers 373, the bracket 372, the lever 371, to depress mechanism for setting a gag or set-bar 19 in the next lower odd position and in the nine position in the appropriate field as required by the code for indicating the even numbered digits.

The embodiment of this invention thus consists of a frame member adapted to be interchanged with the connection basket and to cooperate in conjunction with the same punch mechanism which alternatively is adapted to be operated through the connection basket from a card sensing mechanism. The frame contains a carriage mounted on rails under the control of an escapement device and a carriage return member. In the carriage there is positioned a column of push rods adapted to cooperate with the punch blocking members which in turn determine where in the tabulator card holes are punched. Over the carriage and within the same frame there is likewise positioned a set of parallel motion bars, the lower member of each of which is in a position to depress a push rod in a carriage for the control of the punch blocking member. Likewise, within the frame and over the parallel motion members there is positioned a set of key levers and keys which determine the setting of the punch members through the mechanism as shown, the setting of punch members being conducted in terms of a single unit code or a multi-unit code according to the embodiment of keyboard used.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patents, is:

1. In a punch system, a die, a plurality of punches, a similar plurality of punch blocking members, a carriage thereover, push rod members within said carriage and a plurality of parallel motion systems thereover, each comprising a pair of transverse rods and a pair of rocker arms pivoted thereto whereby said respective bars in each mechanism are caused to move in opposite directions, and key levers positioned thereover, the tails thereof being connected to said bars whereby depression of a key raises a key tail, raises one bar, depresses the other bar and sets a punch blocking member through the operation of said push rods.

2. A card controlled punch to punch blank cards comprising sensing mechanism, columns of punches, columns of punch gags adapted when set to cause the associated punches to perforate a card, and removable translator units controlled by the sensing mechanism for setting the punch gags, a keyboard controlled mechanism, and means for detachably mounting the translator units in the punch whereby the units may be removed and replaced by the keyboard controlled mechanism, said means also serving to mount said mechanism in operative relation to the punch gags.

3. The combination with a punch mechanism including columns of punches and columns of punch gags adapted when set to cause the associated punches to perforate a card, of a plurality of keys, and a movable carriage containing a plurality of swinging levers individually actuable by the keys, a plurality of depressor bars individually actuable by the swinging members, and an escapement mechanism for moving the carriage step by step in one direction to bring the depressor bars into operative relation with the punch gags in successive columns, whereby the punch gags may be set by said keys.

4. The combination with a punch mechanism including columns of punches and columns of punch gags adapted when set to cause the associated punches to perforate a card, of a plurality of keys, and a movable carriage containing a plurality of swinging levers individually actuable by the keys, a plurality of depressor bars individually actuable by the swinging members, an escapement mechanism for moving the carriage step by step in one direction to bring the depressor bars into operative relation with the punch gags in successive columns, whereby the punch gags may be set by said keys, and a bail controlled by any swinging member for actuating the escapement mechanism.

5. The combination with a punch mechanism including columns of punches and columns of punch gags adapted when set to cause the associated punches to perforate a card, of a plurality of keys, and a movable carriage containing a plurality of swinging members individually actuable by the keys, a plurality of depressor bars individually actuable by the swinging members, an escapement mechanism for moving the carriage in one direction to bring the depressor bars into operative relation with the punch gags in successive columns, and a skip key for preventing the control of the carriage by the escapement mechanism whereby the carriage is permitted to travel in the direction in which it is normally moved by the escapement mechanism until it reaches one of its extreme positions or until the skip key is released.

6. The combination with a punch mechanism including columns of punches and columns of punch gags adapted when set to cause the associated punches to perforate a card, of a plurality of keys, and a movable carriage containing a plurality of swinging members individually actuable by the keys, a plurality of depressor bars individually actuable by the swinging members, an escapement mechanism for moving the carriage in one direction to bring the depressor bars into operative relation with the punch gags in successive columns until they are associated with one extreme column of punch gags, and a carriage return lever for moving the carriage in the opposite direction until the depressor bars are operatively associated with the punch gags in the other extreme column.

7. The combination with a punch mechanism including columns of punches and columns of punch gags adapted when set to cause the associated punches to perforate a card, of a plurality of keys, and a movable carriage containing a pair of parallel motion bars individual to each key, a plurality of swinging members individually actuable by the pairs of parallel motion bars, a plurality of depressor bars individually actuable by the swinging members, and an escapement mechanism for moving the carriage to bring the depressor bars into operative relation with the punch gags in any column whereby the punch gags may be set by the keys.

8. The combination with a punch mechanism including columns of punches and columns of punch gags adapted when set to cause the associated punches to perforate a card, of a plurality of keys, and a movable carriage containing a pair of parallel motion bars operatively associated with each key, the upper bar of each pair being raised and the lower bar being depressed by the actuation of the associated key, a plurality of swinging members adapted to be individually depressed by the lower parallel motion bars, a plurality of depressor bars adapted to be individually depressed by the swinging members, and an escapement mechanism for moving the carriage to bring the depressor bars into operative relation to the punch gags in any column whereby the punch gags may be set by the keys.

9. The combination with a punch mechanism including columns of punches and columns of punch gags adapted when set to cause the associated punches to perforate a card, of a plurality of keys and a movable carriage containing a plurality of swinging members individually actuated by the keys, a plurality of depressor bars individually actuated by the swinging members, an escapement mechanism for moving the carriage step by step in one direction to bring the depressor bars into operative relation with the punch gags in successive columns, and a pair of parallel motion bars for actuating a swinging member in response to the actuation of the associated key.

10. The combination with a punch mechanism including columns of punches and columns of punch gags adapted when set to cause the associated punches to perforate a card, of a plurality of keys and a movable carriage containing a plurality of swinging members individually actuated by the keys, a plurality of depressor bars individually actuated by the swinging members, an escapement mechanism for moving the carriage step by step in one direction to bring the depressor bars into operative relation with the punch gags in successive columns, and a pair of parallel motion bars for actuating a swinging member in response to the actuation of the associated key, one of the parallel motion bars in each pair being adapted to actuate the swinging member in response to the operation of the associated key without regard to the position of the carriage.

11. In a keyboard controlled mechanism, a spring tensioned carriage, an escapement mechanism comprising a rack bar, a first pawl normally engaging the rack bar to prevent movement of the carriage but adapted to be advanced one rack bar tooth when disengaged from the rack bar, a second pawl normally disengaged from the rack bar, and a swinging member adapted to be oscillated in opposite directions, said member being adapted when oscillated in one direction to move the second pawl into engagement with the rack bar to prevent movement of the carriage and to disengage the first pawl, said swinging member being adapted, when oscillated in the opposite direction, to disengage the second pawl from, and to engage the first pawl with, the rack bar, whereby the carriage is advanced one step.

12. In a keyboard controlled mechanism a movable carriage containing a plurality of depressor bars, a plurality of swinging members for individually actuating the depressor bars, a pair of parallel motion bars operatively associated with each swinging member, each pair of bars being pivoted to opposite arms of a pair of rocking members, and a plurality of keys each connected to the upper bar of a pair of parallel motion bars whereby the actuation of the key raises the upper bar and depresses the lower bar to cause the depression of a depressor bar.

13. In a keyboard controlled mechanism, a plurality of digit keys, and a movable carriage containing a plurality of depressor bars, a plurality of swinging members for individually actuating the depressor bars, a pair of parallel motion bars associated with each key, each pair of bars including an upper bar operatively associated with an even key and with the next lower odd key and a lower bar operatively associated with one of the swinging members, the even keys being additionally associated with the upper bar associated with the nine key whereby the actuation of the odd key causes the depression of a single depressor bar and the actuation of the low keys causes the depression of two depressor bars.

14. A punch mechanism having columns of punches and columns of punch gags adapted when set to cause the individual corresponding punches to perforate a card, a duplicating mechanism including sensing mechanism and means for transmitting motion from the sensing mechanism to the punch gags, a keyboard controlled mechanism having a plurality of depressor bars for setting the punch gags in a single column and a carriage containing the depressor bars for bringing them into register with successive columns of punch gags, and means for detachably mounting the motion transmitting means in the punch mechanism whereby it may be removed and replaced by the keyboard controlled mechanism.

15. A punch mechanism having a field of punches and a corresponding field of punch gags adapted when set to cause the individual corresponding punches to perforate a card, a duplicating mechanism having a range equal to the entire field of the punches including sensing mechanism and means for transmitting motion from the sensing mechanism to the punch gags, a keyboard controlled punch gag setting mechanism having a range also equal to the entire field of the punches, and means for detachably mounting the motion transmitting means in the punch mechanism whereby it may be removed and replaced by the keyboard controlled mechanism.

16. In a punch mechanism having punches and punch gags adapted when set to cause the individually associated punches to perforate a card, a duplicating mechanism including card sensing mechanism and means for transmitting motion from the sensing mechanism to the punch gags, a keyboard controlled punch gag setting mechanism, locking plates disposed above the punch gags and having longitudinal and transverse grooves, bottom plates on the motion transmitting means and the keyboard controlled mechanism positionable in said longitudinal grooves, and spring pressed latching slides thereon removably positionable in the transverse grooves whereby the motion transmitting means may be removed from the plates and the keyboard controlled mechanism attached thereto.

17. A punch mechanism having a field of punches including columns of said punches and a corresponding field of punch gags adapted to be set to cause the individual corresponding punches to perforate a card, a duplicating mechanism having a range equal to the entire field of the punches including sensing mechanism and means for transmitting motion from the sensing mechanism to the punch gags, a keyboard controlled punch gag setting mechanism, and means for detachably mounting the motion transmitting mechanism and the keyboard controlled mechanism in the punch structure whereby the former may be removed and replaced by the latter, said keyboard controlled mechanism having a column of depressor members and a carriage for bringing said members into register with successive columns of punch gags.

WILLIAM W. LASKER.